United States Patent
Chatterjee

(10) Patent No.: US 10,339,037 B1
(45) Date of Patent: Jul. 2, 2019

(54) RECOMMENDATION ENGINE FOR RECOMMENDING PRIORITIZED PERFORMANCE TEST WORKLOADS BASED ON RELEASE RISK PROFILES

(71) Applicant: INTUIT INC., Mountain View, CA (US)

(72) Inventor: Shreeshankar Chatterjee, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/703,131

(22) Filed: Sep. 13, 2017

(51) Int. Cl.
  *G06F 11/36* (2006.01)
  *G06F 16/951* (2019.01)
  *G06F 9/44* (2018.01)

(52) U.S. Cl.
  CPC ...... *G06F 11/3684* (2013.01); *G06F 11/3688* (2013.01); *G06F 16/951* (2019.01)

(58) Field of Classification Search
  CPC . G06F 11/3684; G06F 11/3688; G06F 16/951
  USPC .......................................................... 717/124
  See application file for complete search history.

(56) References Cited

U.S. PATENT DOCUMENTS

| | | | |
|---|---|---|---|
| 2006/0195725 A1* | 8/2006 | Shah ................... | G06F 11/3414 714/47.3 |
| 2012/0297251 A1* | 11/2012 | Masser ............... | G06F 11/3688 714/37 |
| 2014/0033176 A1* | 1/2014 | Rama .................. | G06F 11/3688 717/124 |
| 2015/0248344 A1* | 9/2015 | Farinacci ............ | G06F 11/3692 714/38.1 |
| 2016/0188450 A1* | 6/2016 | Appusamy .......... | G06F 11/3664 714/38.1 |
| 2016/0357660 A1* | 12/2016 | Dean ................... | G06F 11/3692 |
| 2017/0177416 A1* | 6/2017 | Altman ................ | G06F 9/5083 |
| 2018/0004643 A1* | 1/2018 | Conti .................. | G06F 11/3688 |

* cited by examiner

*Primary Examiner* — Anna C Deng
(74) *Attorney, Agent, or Firm* — Patterson + Sheridan, LLP

(57) ABSTRACT

Aspects of the present disclosure describe methods and systems for recommending prioritized performance test workloads. An example method generally includes searching one or more external resources using a keyword from a number of keywords associated with a baseline test workload for a software release. The method further includes creating a risk profile for the software release based, at least in part, on a number of matches found in search results resulting from the searching. In addition, the method includes generating a prioritized test workload for execution over one or more prioritized variability dimensions based on the risk profile and the baseline test workload. The method also includes executing a test of the software release based on the prioritized test workload.

18 Claims, 6 Drawing Sheets

US 10,339,037 B1

RECOMMENDATION ENGINE FOR RECOMMENDING PRIORITIZED PERFORMANCE TEST WORKLOADS BASED ON RELEASE RISK PROFILES

BACKGROUND

Field

Embodiments presented herein generally relate to conducting performance tests and discovering defects in software applications, and more specifically to recommending prioritized performance test workloads to test software products.

Description of the Related Art

Commercial software is increasingly being provided using distributed architectures through public and private cloud computing environments to global customers. These software products can include common programming subsystems and individualized program components for specific customers, markets, regions, etc. Commonly, developers work in teams devoted to the creating and maintaining a single subsystem or individualized component. Thus, many development teams work in parallel to maintain the program, but with minimal inter-team communication. A problem with such distributed independent development teams is that defects can be introduced into the program when the individual teams each update the portion of the source code they are responsible for updating, maintaining, and developing. Accordingly, in some cases, prior to a release of a software update, performance tests are executed in a number of test scenarios that simulate the actual scenarios or variability dimensions under which the software release may be deployed and provisioned to various users.

As there is typically a limited amount of time allotted for conducting performance tests before software is released or updates are deployed, however, it becomes critical to conduct performance tests that are effective and efficient to increase the likelihood that performance defects or other errors are discovered and rectified before release or deployment.

SUMMARY

One embodiment of the present disclosure includes a method for recommending prioritized performance test workloads. The method includes searching one or more external resources using a keyword from a number of keywords associated with a baseline test workload for a software release. The method further includes creating a risk profile for the software release based, at least in part, on a number of matches to the keyword in search results resulting from the searching. The method also includes generating a prioritized test workload for execution over one or more prioritized variability dimensions based on the risk profile and the baseline test workload. The method further includes executing a test of the software release based on the prioritized test workload.

Another embodiment of the present disclosure includes a system comprising a processor and memory having instructions stored thereon which, when executed, performs an operation for recommending prioritized performance test workloads. The operation generally includes searching one or more external resources using a keyword from a number of keywords associated with a baseline test workload for a software release. The operation further includes creating a risk profile for the software release based, at least in part, on a number of matches to the keyword in search results resulting from the searching. The operation also includes generating a prioritized test workload for execution over one or more prioritized variability dimensions based on the risk profile and the baseline test workload. The operation further includes executing a test of the software release based on the prioritized test workload.

Still another embodiment of the present disclosure includes a computer-readable medium having instructions stored thereon, which, when executed by a processor, performs an operation for recommending prioritized performance workloads. The operation generally includes searching one or more external resources using a keyword from a number of keywords associated with a baseline test workload for a software release. The operation further includes creating a risk profile for the software release based, at least in part, on a number of matches to the keyword in search results resulting from the searching. The operation also includes generating a prioritized test workload for execution over one or more prioritized variability dimensions based on the risk profile and the baseline test workload. The operation further includes executing a test of the software release based on the prioritized test workload.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Generally, developers of commercial software applications can utilize a cloud or a hybrid cloud architecture to deliver continuous global access to software products. Applications deployed via a cloud or a hybrid cloud architecture often include many subsystems that work together to provide the services to users. In one example, a cloud-based application can serve separate user interfaces to users based, for example, on a location of the user. Each of these interfaces may implement region, company type, company size-specific, or other variations on various features. In an invoice generation example, generating invoices for purchase orders may use similar inputs. However, the generated invoices may differ based on tax regulations in different geographical regions. To allow users to generate invoices that comply with regional regulations, each regional interface can provide application functionality using region-specific processing rules and common subsystems that need not be region-specific.

Commonly, the individual components, or modules, of the software system are developed and maintained by separate teams that work concurrently and often with minimal inter-team coordination. These largely independent development teams allow developers to quickly add features or modify existing features in the software modules. However, the lack of centralized control and coordination between teams responsible for different components in a software system greatly increases the probability of a defect being released into the live software system that adversely affects customer reliability, performance, or both, as independent teams may not be able to fully test updates to individual software system components to identify problems that may result from interactions between existing software modules and the updated software module. As a result, in some cases, prior to the release of a certain software update into the live software system, performance tests are performed to discover performance defects of the software update. Typically, however, there is only a limited amount of time (e.g., 3 days) allocated for verifying that defects identified in a previous version of the software system have been rectified and that the code changes made to the software system have not introduced new problems into the software system. Spending this limited amount of time on testing software modules and code segments that are less likely to contain defects results in an inefficient use of the limited resources, including the limited amount of time, allocated for conducting performance tests prior to a software release.

Accordingly, certain embodiments described herein related to recommending and executing prioritized performance test workloads resulting in significantly increasing the chances of identifying a higher number of performance defects during the limited amount of time available allocated for testing prior to a software release.

Figure 1:
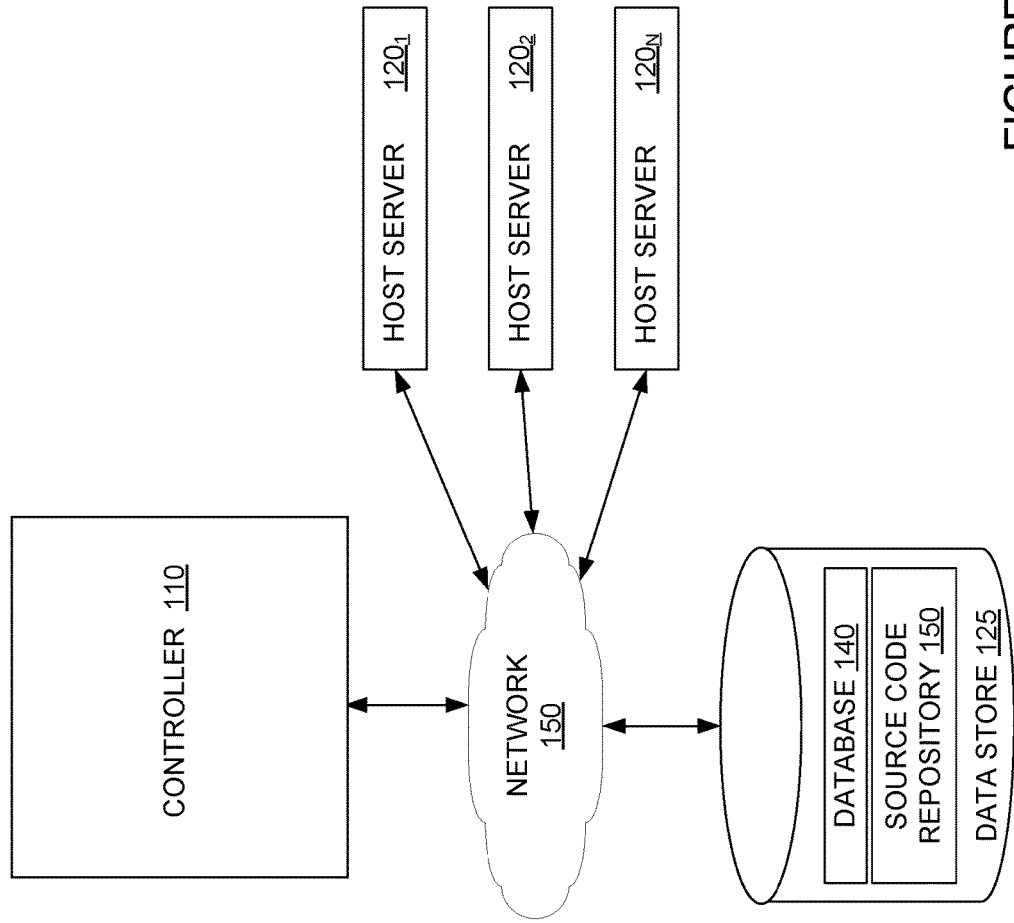
FIG. 1 illustrates an example system, according to some embodiments.

FIG. 1 illustrates an example system 100, according to some embodiments, for conducting performance tests prior to the release of a software update into a software system. As shown, system 100 includes a controller 110 and one or more host servers 120, a data store 125 that includes a source code repository 130, and a database 140, each of which communicates with each other via network 150.

In some cases, to test a software update, controller 110 may be configured with different sets of test operations that controller 110 can invoke on the one or more host servers 120. Each set of test operations may include, for example, information defining messages to be transmitted to the one or more host servers 120 to invoke a simulated performance test, parameters to include in the messages invoking the simulated performance test, and the like. In some cases, each set of test operations also includes information relating to a sequence of operations that are to be performed by the one or more host servers 120 by invoking functions exposed by various source code files associated with the software update being tested. Source code repository 130 stores the source code files that are executed by host servers 120 and tested via controller 110, and tracks and stores different versions of the source code files as the files are updated by developers.

Controller 110 generally uses performance data obtained from the one or more host servers 120 to determine if the tested software application functions as expected. As an example, after receiving performance data from the one or more host servers 120, in some embodiments, controller 110 may compare the received performance data to historical performance data and/or performance threshold information in a definition of a test operation to determine if the tested software application deployed on the one or more host servers 120 is working properly. In some cases, using the performance data, controller 110 may also determine where in the corresponding source code and under which test scenarios the defects or code errors exist. Database 140 stores performance results and contextual metadata created by controller 110 during operation of the system 100.

The one or more host servers 120 provide software to a global customer base by executing a number of software modules that function together to provide a complex set of software features for numerous region specific instances of the software. For example, host servers 120 can provide distinct user interfaces for specific countries, such as distinct user interfaces for France, Spain, and the United States. Each country-specific interface can have a dedicated software module for applying country specific rules, such as accounting practices, performing tax calculations, and the like, as well as rely on common software modules, such as communicating with third party application or accessing databases that store system-wide information. In addition to the region, the set of features and user interfaces of the software may differ depending on the company type, company size, etc. For example, host servers 120 may provide distinct user interfaces for large, medium, and small companies. As discussed above, the combination of dedicated and common software modules can cause a change in one module to affect many different customer groups.

As described above, host servers 120 may each execute simulated performance tests in response to receiving test operations from controller 110. An example of a simulated performance test may involve a host server 120 executing a standard baseline workload in a set of variability dimensions, each corresponding to a test scenario. The standard baseline workload, in some embodiments, may include customer use cases corresponding to the software update being released. For example, assume a software update is about to be released for an accounting software package with a variety of software modules, features, and user interfaces that may vary based on region, company size, company type etc. In such an example, a standard baseline workload may comprise data relating to a number of customer use cases corresponding to the accounting software package as well as a metric for indicating, for instance, the peak-hour throughput associated with each use case. In some cases, the peak-hour throughput may be expressed in terms of transactions per second (TPS). Examples of a customer use case or transaction may include creating a bill, getting a chart for an account, creating a report, etc., each of which may be mapped to one or more user interface categories, application programming interfaces (APIs), and/or workflows. For example, for customer use case or transaction "creating a bill," the user interface or API category may be "invoice," and the corresponding workflow may be "purchasesales/save."

Figure 2:
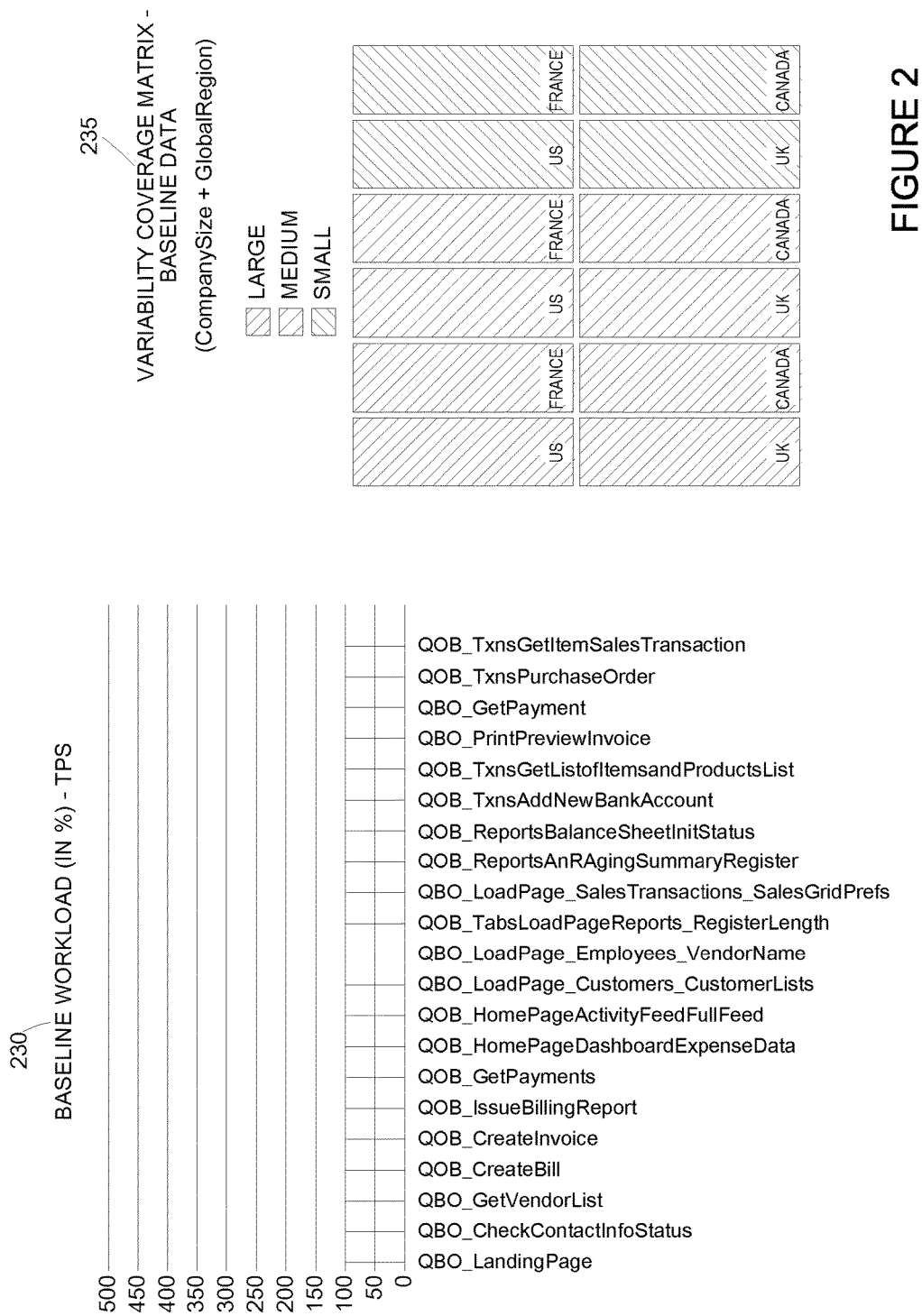
FIG. 2 illustrates an example baseline standard workload and an example variability coverage matrix, according to some embodiments.

FIG. 2 illustrates an example of a standard baseline workload 230 and variability coverage matrix 235. As described above, a standard baseline workload includes a number of customer use cases relating to a software package for which an update is being released. For example, standard baseline workload 230 illustrates customer use cases including "LandingPage," "CheckContactInfoStatus," "GetVendorList," etc., each having an associated testing TPS (not shown) that may, for example, be determined based on historical usage patterns. For example, historical usage patterns relating to a particular use case, e.g., "GetVendorList," may indicate that, on average, the use case receives 25 requests per second during peak hours. Accordingly, to ensure that the updated software module or user interface relating to the use case "GetVendorList" is able to handle 25 requests per second, a performance test generating according to baseline workload 230 is directed to simulate 25 transactions per second. For another use case, such as "LandingPage," the performance test may be directed to simulate 48 TPS to determine whether the use case is able to respond to 48 requests per second when the software update is released without any performance bottlenecks, code failures, etc.

As shown in FIG. 2, the use cases or transactions in the baseline workload 230 are illustrated on the x-axis of a graph 230 that illustrates the standard baseline workload. The y-axis shows a weight associated with the workload (i.e., a scaling factor applied to the baseline TPS) for each of the use cases. In FIG. 2, the weight associated with each of the use cases is normalized to 100%, or a scaling factor of 1.0, which indicates a baseline workload that has been defined for each use case. For example, a use case such as "GetVendorList" with a 25 TPS, and an associated weight of 100%, indicates that a performance test for the use case would be performed with 25 transactions per second. However, a change to the weight or scaling factor associated with a use case's workload, as further described below in relation to FIGS. 3 and 4, generally results in a change in the number of TPS executed for that particular use case when test operations are executed by controller 110. As an example, a change of weight from 100% to 150% for use case "GetVendorList," results in an increase in the generation of a test workload with 37.5 transactions per second to be executed for testing the "GetVendorList" use case as opposed to the 25 transactions per second defined in the baseline workload 230.

As described above, because the software update may eventually be deployed to various regions and be provisioned to users of various company sizes and types while using various web services platforms, the test workload (e.g., standard baseline workload 230) defined for the software may be executed in similar testing scenarios, each corresponding to a number of variability dimensions (e.g., system configurations). For example, FIG. 2 shows variability coverage matrix 235, which comprises twelve testing scenarios resulting from a combination of two variability dimensions of "company size" and "region." As a result, a test operation that includes standard baseline workload 230 and variability coverage matrix 235 may direct host servers 120 to execute workload 230 over the variability dimensions of matrix 235. For example, if a 48 TPS has been defined for use case "LandingPage," each second, the 48 transactions may be distributed evenly over the twelve testing scenarios of variability coverage matrix 235. As shown in FIG. 2, the twelve testing scenarios may include Large-US, Large-France, Large-UK, Large-Canada, Medium-US, Medium-France, Medium-UK, Medium-Canada, Small-US, Small-France, Small-UK, and Small-Canada. Accordingly, each of the test scenarios receives 4 transactions per second.

Defining test metrics, such as TPS, for a number of use cases relating to a software update and executing the resulting workload over a number of variability dimensions without taking into account performance risks associated with the software update release and adjusting the test metrics and variability dimensions based on the performance risks, however, results in performing inefficient and ineffective performance tests. As an example, the underlying code for a certain software release may be more focused on updating certain software modules and not others. Accordingly, users are more likely to experience bugs or defects when using the heavily updated software modules as opposed to other modules that have not been updated as much by the software release. A risk profile, created as described in relation to FIGS. 3-6, identifies those code segments that are associated with a higher risk of introducing bugs or defects into the software and, therefore, enables tests to be prioritized and focused on testing those code segments.

Conducting prioritized performance tests is critical because, as described above, prior to every software update release, there is typically only a limited amount of time (e.g., 3 days) allocated for verifying that defects identified in a previous version of the software system have been rectified and that the code changes made to the software system have not introduced new problems into the software system. Spending this limited amount of time on testing use cases with a very low probability of having defects or focusing on very low-risk variability dimensions (e.g., on source code that has not changed or has had minimal changes in the software update or source code for which not many performance issues have been reported by users), therefore, results in less testing time being available for testing higher-risk aspects of the software update (e.g., variability dimensions for which the underlying source code has been updated). Because there may be less testing time available for testing these higher-risk aspects of the software update, spending testing time on testing use cases with a low probability of defects may result in a high number of product defect leaks.

Accordingly, certain embodiments described herein relate to creating and adjusting test workloads and prioritizing certain variability dimensions based on a risk profile associated with the software release, resulting in significantly increasing the probability of discovering a higher number of performance defects prior to the software release.

Figure 3:
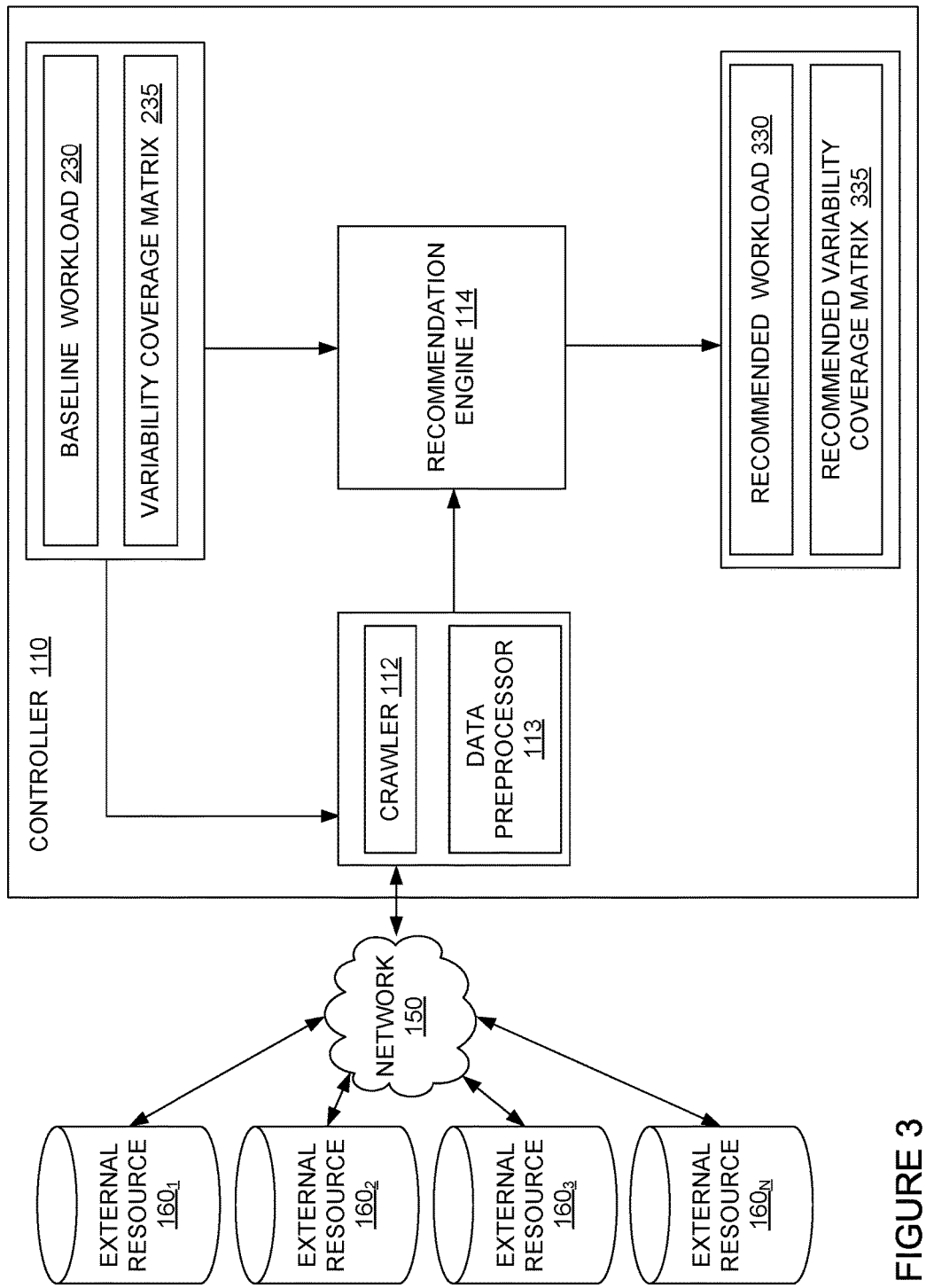
FIG. 3 illustrates an example controller for generating prioritized performance test workloads for execution over a number of prioritized variability dimensions, according to some embodiments.

FIG. 3 illustrates an example controller 110 that creates a risk profile associated with a software release and recommends a test workload to test the software release, according to some embodiments. In the embodiments described herein, testing may refer to or include simulated execution of software or code on an existing software system or a software system under development. Executing a test based on a recommended or prioritized workload may refer to or include performing a simulation of the recommended or prioritized workload.

As described above, in some embodiments, the standard baseline workload 230 and variability coverage matrix 235 may be created based on a set of customer use cases or transactions mapped to one or more user interfaces of and/or APIs associated with the software being tested. As also described above, each customer use case in baseline workload 230 may also be associated with a tag that describes the user interface, API and/or workflow corresponding to the use case. In addition, a performance testing metric, such as a TPS, may be defined for each use case based on, for example, the corresponding throughput of each use case during peak hours.

An example data structure that may be used for each use case in the workload may be as follows: <atomic transaction flow 1> <tags that describe the UI/API/workflow> <estimated peak hour throughput>. For example, for use case "CreateBill," the data structure may be: <Transaction: CreateBill, Tags: Invoice, purchase/save, PeakTPS: 35>. As described above, each workload is then executed in a number of variability dimensions, examples of which were shown in variability coverage matrix 235. In some embodiments, there may be at least four main variability dimensions including, company size (e.g., large, medium, small, etc.), company type (e.g., payroll and payments, etc.), region (e.g., US, France, Canada, UK, etc.), and hosting service (e.g., external hosting or internal hosting).

As discussed above, baseline workload 230, once generated, may be stored in data store 125 and made accessible to controller 110 for recommending a prioritized test workload. As shown in FIG. 3, data defining baseline workload 230 is used by controller 110 to crawl external resources 160 to create a risk profile for the corresponding software release. More specifically, FIG. 3 shows crawler 112 that receives, as input, metadata relating to baseline workload 230 and/or variability coverage matrix 235. The metadata, in some embodiments, comprises tags and keywords for each use case in baseline workload 230. For example, the metadata may include keywords such as "CreateBill," which is the name of a use case, and "Invoice," which is a tag that describes the corresponding API or functions exposed by an API. In addition, in some embodiments, each tag and keyword may be assigned the same baseline weight. In some embodiments, the weight is 1, or 100%, etc.

In some embodiments, the baseline workload metadata may also include information about variability dimensions keywords from a variability coverage matrix (e.g., variability coverage matrix 235) that has been created specifically for baseline workload 230. For example, keywords and tags relating to variability coverage matrix 235 may include: "large, medium, small, US, France, Canada, UK, etc." In some embodiments, the metadata may include keywords from all possible variability dimensions that the baseline workload may be executed in. For example, the metadata may include keywords relating to company size (e.g., larger, medium, small), company type (e.g., payment, payroll), hosting service, and region (e.g., UK, US, France. etc.). As described above, each keyword may be assigned a baseline weight or scaling factor, which may be 1, or 100%, etc.

Having received the baseline workload metadata, crawler 112 accesses external resources 160 through APIs and performs searches therein, using the keywords and tags (a tag itself is a keyword for search purposes) in the baseline workload metadata, to create a risk profile for the latest software update or release. For example, crawler 112 may limit the search to data that has been generated and stored in external resources 160 since the last release, thereby enabling the creation of a risk profile that is exclusively based on data that relates to the latest software update or release. For example in a versioning system, the crawler can analyze files that have a later version number (corresponding to the latest software update) than the version of the source code files used in a previous release.

In some embodiments, searches may be performed by crawler 112 using various keyword matching options. For example, keyword matching options may include close variant keyword matching. A search for a keyword or tag using the close variant keyword matching option results in including any close variations of the keyword or tag, which may include misspellings, singular forms, plural forms, acronyms, stemmings (such as floor and flooring), abbreviations, and accents.

External resources 160 may be databases comprising, for example, data relating to the new or recently updated software or code (e.g., feature changes or line of code check-ins for specific features or use cases, etc.), usage patterns of the latest production, global variability dimensions of the latest production, production defects, operational incidents corresponding to the cluster profiles, customer care complaints, recent operational feedback, customer experience information, etc. For example, one or more external resources 160, providing data relating to the new or recently updated software or code, may comprise software development tools or platforms (e.g., GitHub, JIRA, Agile, etc.). In addition, an example of an external resource 160 that provides data relating to production defects corresponding to the latest software release may be a software development tool or platform such as JIRA. Also, an example of an external resource 160 providing data relating to customer experience (e.g., customer care incidents or complaints) may be one or more customer care portals. Further, an example of external resource 160 providing data relating to operational incidents may be an incident management platform, which logs support tickets related to failures in the software system.

In some embodiments, search results generated by crawler 112, through searching one or more external resources 160 using keywords and tags included in the baseline workload, may be preprocessed by data preprocessor 113. Data preprocessing may refer to a data mining technique that involves transforming raw data into a format that can be more easily and effectively used for another process. Data preprocessing may involve data cleaning, integration, transformation, reduction, and discretization. In some embodiments, data preprocessor 113 may preprocess the search results generated by crawler 112 to be used for creating a risk profile. For example, data preprocessor 113 may implement one or more methods to use the preprocessed search results in adjusting the initial weights associated with the keywords and tags in the metadata of the baseline workload and/or variability coverage matrix. In some embodiments, data preprocessor 113 may implement a machine learning technique, such as decision trees, for performing the weight adjustments. In some embodiments, for example, one or more decision trees may be trained for search results generated from each external resource 160.

For example, assume a tag, such as "Invoice," is used by crawler 112 for searching an external resource 160, e.g., JIRA, for all production defects corresponding to the tag. In such an example, the search results may include data generated by crawler 112 from crawling various production defect tickets issued as a result of invoice related transactions. In such an example, a decision tree may be trained specifically for search results being generated from searching JIRA. In such embodiments, the decision tree may be trained such that for any invoice-related instance of a priority 0 (P0) or priority 1 (P1) performance defect ticket that the decision tree encounters, the weight associated with all invoice-related keywords and/or tags may be adjusted higher by a certain amount (for other priority types, the weights may be adjusted by a different or smaller amount). For example, the weight associated with "CreateInvoice," which was an invoice-related keyword included in the baseline workload metadata, may be adjusted higher (e.g., from 100% to 105%) for every instance of invoice-related P0 or P1 tickets that the decision tree encounters while processing search results generated from searching JIRA. This is because a large number of tickets generated for a certain software module (e.g., Invoice) may indicate a large number of defects relating to that software module. Accordingly, more rigorous testing of such a software module may be more effective as opposed to other software modules for which a smaller number of tickets have been issued.

In another example, a decision tree may be trained for search results generated from searches performed to identify new or recently updated software or code. In such an example, the decision tree may be trained such that, in response to encountering a large number of code check-ins for a software module, such as "Billing," weights associated with all keywords and/or tags relating to "Billing" may be adjusted higher. For instance, each time the decision tree encounters an instance of a code check-in relating to "Billing," the weight associated with the keyword "Billing," may go up by a predefined amount, such as 2 percentage points (e.g., from 100% to 102%). In addition, weights associated with all billing-related keywords (e.g., CreateBill, IssueBillingReport, etc.) may also increase as well. This is because a large number of code check-ins associated with a certain software module may indicate a large number of changes or updates relating to that software module and some or all its use cases. Accordingly more rigorous testing of that software module, or use cases relating to that software module, may be more effective in terms of identifying performance defects as opposed to testing software modules that have not had many code check-ins or have not been heavily updated since the last software release.

In addition, in some embodiments, decision trees may be trained such that weights associated with various variability dimensions may also be adjusted when the search results are processed by the decision trees. As an example, a decision tree may encounter a high number of billing related code check-ins for the France region. This may indicate that software including, for example, billing-related user interfaces provisioned to users in France have been heavily updated. As a result, the decision tree may not only adjust the weight associated with all billing-related keywords or tags, but it may also adjust the weight associated with the France region. Other examples may include search results that, when processed by a decision tree, indicate a high frequency of "Payroll" (i.e., system configuration for company type) in clusters being hosted by a certain hosting service (e.g., an internal hosting service). Yet another example is a high frequency of incidents relating to a certain user interface category (e.g., Invoice) in clusters being hosted by a certain hosting service (e.g., an external hosting service) for a certain company size (e.g., large) in a certain region (e.g., UK).

The decision trees described above are merely examples and are not intended in any way to limit the scope of the present disclosure. For example, various types of decision tree models, including a composite decision tree model, may also be used. In addition, other techniques, including other machine learning techniques, may be used to process search results generated from external resources 160 and adjust weights associated with various keywords and tags included in the baseline keyword metadata.

Accordingly, what results from processing (e.g., by using decision trees) search results generated from external sources 160 is a risk profile defining a prioritized test workload for a software release. The risk profile may be defined, for example, as a set of keywords, tags, and variability dimensions each having a weight or scaling factor 230 that has been adjusted by data preprocessor 113 based on the preprocessed search results. For example, the baseline weight associated with "Billing," may be adjusted from 100% to 140%. In another example, the baseline weight associated with "Large Companies" may be adjusted from 100% to 140%. Data preprocessor 113 then sends the set of keywords, tags, and variability dimensions, with adjusted weights, to recommendation engine 114. In addition to the risk profile, recommendation engine 114 also takes, as input, the standard baseline workload (e.g., baseline workload 230), including a set of use cases each having a corresponding TPS and, in some embodiments, a variability coverage matrix (e.g., variability coverage matrix 235), which may identify the variability dimensions that the baseline workload may be executed it. Information relating to the variability coverage matrix may also indicate how TPS metrics associated with each use case is distributed over the various variability dimensions. In some embodiments, the input to recommendation engine 114 may not include a variability coverage matrix, such as variability coverage matrix 235, which is generated specifically for baseline workload 230.

Accordingly, input to recommendation engine 114 comprises two sets of information, including (1) a risk profile for the latest software release that comprises a set of keywords, tags, and variability dimensions, with adjusted weights, and (2) standard baseline workload including a set of use cases each having a corresponding TPS and, in some embodiments, a variability coverage matrix (e.g., 235) and a distribution of the TPS relating to each use case in the baseline workload. To further illustrate the input to recommendation engine 114, for example, the set of keywords, tags, and variability dimensions may include "CreateBill," "Invoice," "Large Companies," "Amazon Web Services," "LandingPage," etc., with adjusted weights such as 150%, 130%, 115%, 140%, and 100%, respectively.

Also, for example, the standard baseline workload may include use cases such as "CreateBill," "GetPayments," and "LandingPage," having TPSs such as 24, 25, and 50, respectively. Also, as described above, in embodiments the input to recommendation engine 114 includes information relating to a variability coverage matrix that has been generated specifically for the baseline workload. In such embodiments, the information may, for example, include variability coverage matrix 235, where there are 12 variability dimensions, as described above in relation to FIG. 2, resulting in an even distribution of each use case's TPS over all 12 variability dimensions (e.g., the 24 TPS of "CreateBill" may be distributed over the 12 variability dimensions, such that each variability may receive 2 transactions per second during the test).

After receiving input (1), from data processor 113, and input (2), in some embodiments, recommendation engine 114 applies one or more recommendation models to determine how the risk profile matches with the baseline workload and the distribution of transactions over a set of variability dimensions. In some embodiments, various recommendation model packages may be used, including hybrid models. After applying one or more recommendation models to input (1) and input (2), recommendation engine 114 may generate recommended workload 330 as well as recommended variability coverage matrix 335.

In generating recommended baseline workload 330, recommendation engine 114 may, for example, determine that the weight associated with the user interface category "Invoice" is higher than the baseline weight, in which case, recommendation engine 114 may increase the number of transactions per second for all invoice-related use cases in the baseline workload when generating recommended workload 330. As an example, "GetPayments," which is an invoice-related use case, may initially have a 25 TPS workload in baseline workload 230, as described above. However, after determining that the weight associated with "Invoice" is 150% in the risk profile, recommendation engine 114 may increase the TPS of "GetPayments," to 37.5 TPS (i.e., 25×150%).

In addition to adjusting all the workloads (e.g., TPSs) associated with the use cases based on the risk profile, in some embodiments, recommendation engine 114 may also adjust the distribution of each use case's workload over the initial variability coverage matrix 235. For example, recommendation engine 114 may determine a weight of 140% that is associated with "medium companies" in the risk profile. Accordingly, recommendation engine 114 may recommend a higher percentage of transactions for each use case to be executed for testing in variability dimension "medium."

In some embodiments, as described above, input to recommendation engine 114 may not include information relating to a variability coverage matrix (e.g., 235) that has been generated for baseline workload 230. In such embodiments, recommendation engine 114 may recommend one or more variability dimensions over which the recommended workload may be executed. As an example, after determining that the weights associated with variability dimensions "Large Companies," and "France" are higher than weights associated with other variability dimensions, recommendation engine 114 may recommend allocating a larger portion of the transactions, relating to the use cases of the recommended workload, for execution in test scenarios involving source code relating to larger companies and France.

Figure 4:
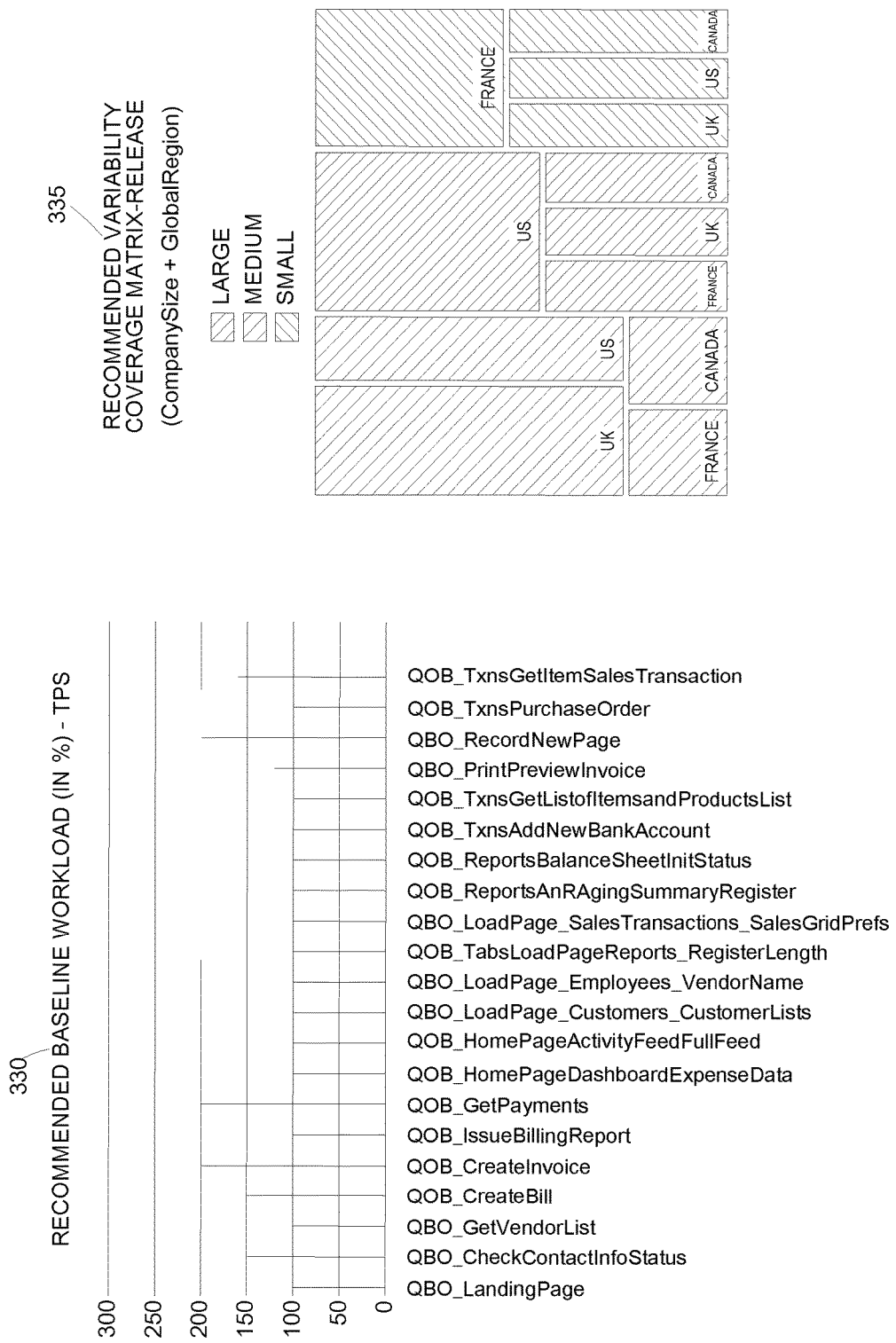
FIG. 4 illustrates an example recommended workload and an example recommended variability coverage matrix, according to some embodiments.

FIG. 4 illustrates recommended workload 330 and variability coverage matrix 335 of FIG. 3 in more detail. Recommended workload 330 shows a number of use cases having TPS metrics at higher than their initial 100% weight. An example of a use case whose TPS increased by recommendation engine 114 was described above and shown in the graph of recommended workload 330 (e.g., the TPS for the "GetPayments" workload has been scaled by a factor of 1.5 (i.e., is 150% of the baseline TPS)). An example of adjusting the distribution of the use cases' workloads (in TPS) over a set of variability dimensions was also described above and is shown by the recommended variability coverage matrix 335. Recommended variability coverage matrix 335 shows variability dimension "medium" covering a larger area than the other variability dimensions (e.g., large and small). In some embodiments, covering a larger area of the coverage matrix corresponds to receiving a higher percentage of the transactions allocated to the use cases on a per second basis.

As an example, if variability dimension "medium" covers 50% of the entire coverage matrix, then half of the transactions relating to each use case may be executed for testing in variability dimension "medium." Furthermore, recommended variability coverage matrix 335 also shows certain regions within variability dimension "medium" to be larger than others. For example, the largest region corresponds to the UK region within variability dimension "medium." This indicates that recommendation engine 114 has made a determination that there is a higher probability of defects being found in code segments relating to the combination of those two variability dimensions (medium and UK) and, therefore, a higher number of transactions per second may be executed for each use case within the "UK region" of variability dimension "medium."

Figure 5:
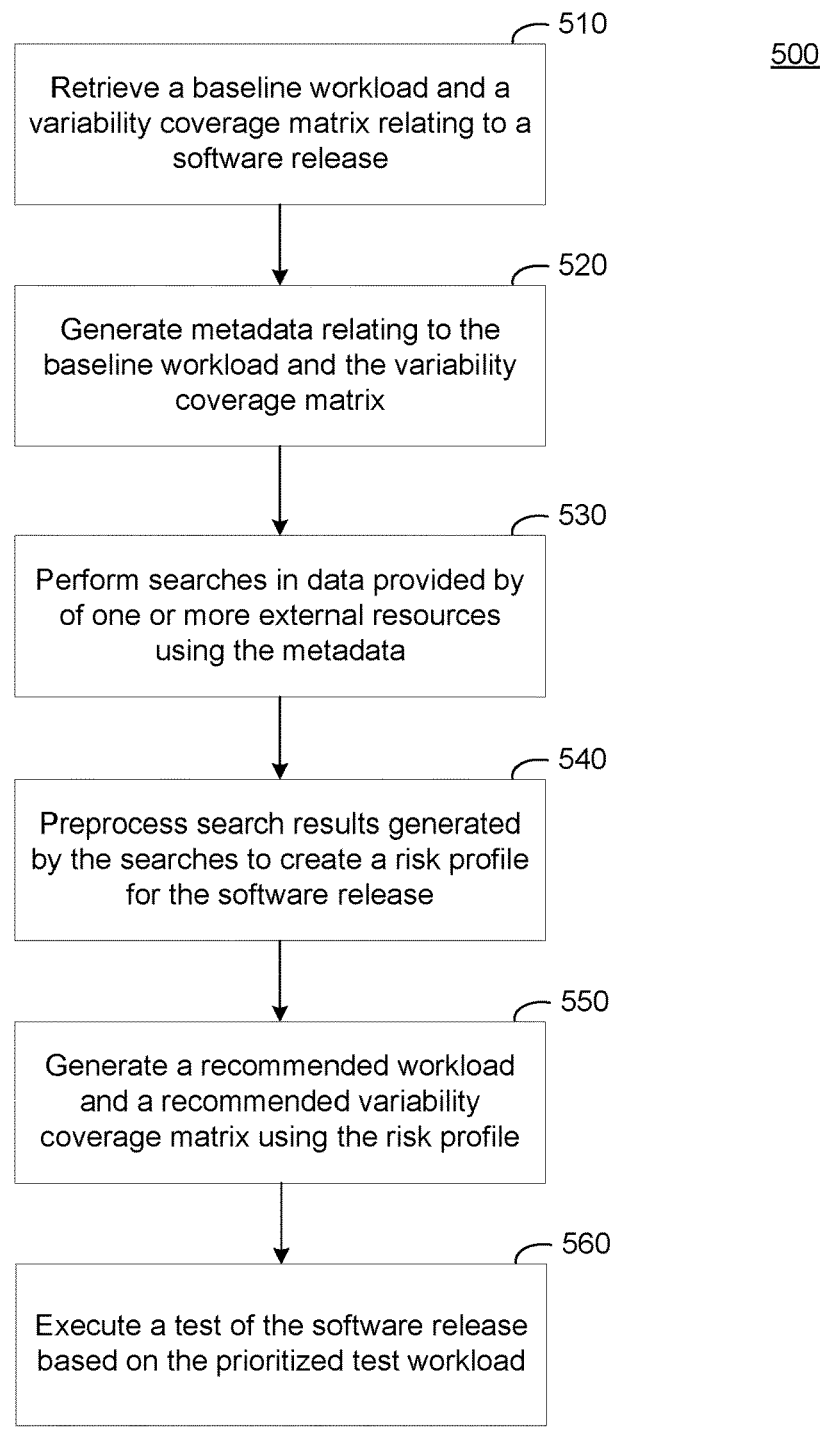
FIG. 5 illustrates example operations for recommending a performance test workload for a software system, according to some embodiments.

FIG. 5 illustrates example operations for recommending a test workload to be executed in a set of recommended variability dimensions, in accordance with some embodiments. Steps 510-560 of FIG. 5 are described herein by reference of FIGS. 2-4.

At 510, controller 110 retrieves a baseline workload (e.g., baseline workload 230) and a variability coverage matrix that are generated based on a set of customer use cases or transactions mapped to one or more user interfaces of and/or APIs associated with the software release that is to be tested. As described above in relation to FIG. 3, each use case or transaction in the baseline workload is assigned a workload metric, such as TPS. In some embodiments, baseline workload 230 may be generated by controller 110 for use in operations 500 in real time. In some embodiments, controller 110 may retrieve baseline workload 230 from its storage (e.g., storage 610) or receive it from an external storage or component.

At 520, controller 110 generates metadata relating to baseline workload 230 and/or variability coverage matrix 235. The metadata, in some embodiments, comprises tags and keywords relating to each use case in baseline workload 230. In some embodiments, the metadata may also include keywords relating to variability dimensions (e.g., AWS, IHP, Larger, Small, Medium, UK, US, etc.). The keywords and tags may also have a weight associated with them that may be later adjusted by data preprocessor 113, as described below.

At 530, crawler 112 performs searches in data stored or provided by external resources 160, as described above in relation to FIG. 3, using the keywords and tags included in the metadata of baseline workload 230. The search results generated by crawler 112 are then passed to data preprocessor 113.

At 540, data preprocessor 113 preprocesses the search results generated by crawler 112 for further processing by one or more techniques (e.g., decision trees) to adjust the weights associated with the keywords and tags in the metadata of baseline workload 230 and/or variability coverage matrix 235. As described above in relation to FIG. 3, what results from the preprocessing performed by data preprocessor 235, including the application of decision trees to the preprocessed data generated by crawler 112, is a risk profile that is created for the software release.

At 550, recommendation engine 114 generates a recommended or prioritized workload (e.g., recommended workload 330) and a recommended or prioritized variability coverage matrix (e.g., recommended variability coverage matrix 335), using information that, in some embodiments, includes (1) the risk profile of step 540 comprising a set of keywords, tags, and variability dimensions, with adjusted weights, and (2) standard baseline workload including a set of use cases each having a corresponding TPS, as well as a variability coverage matrix and a distribution of TPS relating to each use case in the baseline workload.

At 560, controller 110 transmits test operations, including the recommended workload and a recommended variability coverage matrix, to host servers 120 to invoke the execution of one or more tests based on the recommended workload and recommended variability coverage matrix.

Accordingly, as described above, adjusting test workloads and the distribution of such workloads over a number variability dimensions based on one or more risk profiles associated with the software release results in effectively and efficiently using the limited resources available prior to a software release and significantly increasing the probability of discovering a higher number of performance defects, as a result.

Figure 6:
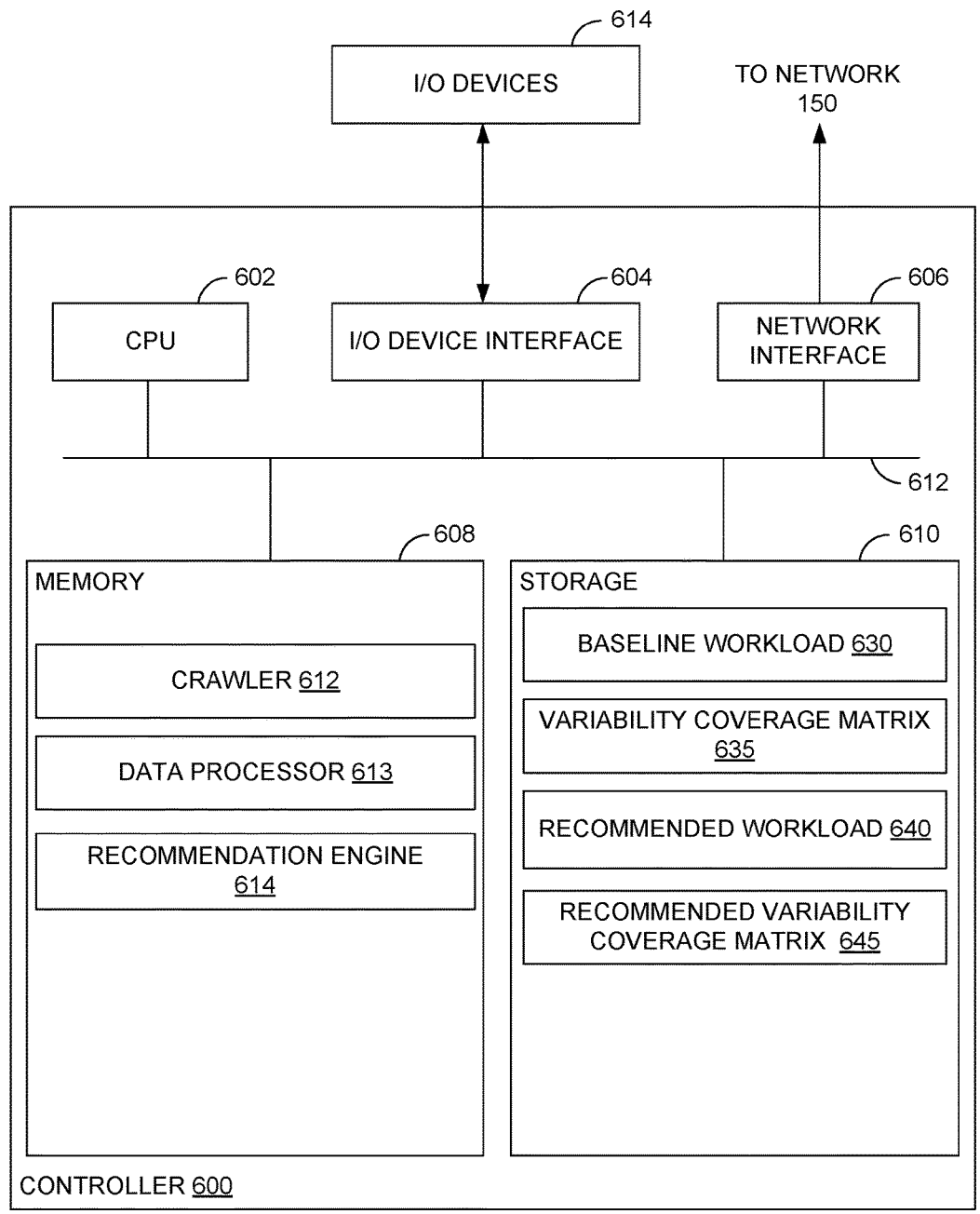
FIG. 6 illustrates an example computing system for recommending prioritized performance test workloads for execution over a number of prioritized variability dimensions, according to some embodiments.

FIG. 6 illustrates an example computing system for recommending prioritized performance test workloads, based on risk profiles relating to a software release, for execution over a number of prioritized variability dimensions. As shown, the controller 600 includes, without limitation, a central processing unit (CPU) 602, one or more I/O device interfaces 604 which may allow for the connection of various I/O devices 614 (e.g. keyboards, displays, mouse devices, pen inputs, etc.) to controller 600, network interface 606, a memory 608, storage 610, and an interconnect 612.

CPU 602 may retrieve and execute programming instructions stored in the memory 608. Similarly, the CPU 602 may retrieve and store application data residing in memory 608. The interconnect 612 transmits programming instructions and application data, among the CPU 502, I/O device interface 610, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes crawler 612, corresponding to crawler 112, configured to receive information including workload-related metadata and use it to access external resources 160 and perform searches therein using keywords, tags, etc., included in the metadata. Memory 608 also includes data preprocessor 613, corresponding to data processor 113, which is configured to preprocess search results generated by crawler 612 to enable further processing for creating risk profiles. In some embodiments, crawler 612 and data processor 613 may be parts of the same application and, in some other embodiments, they may be separate applications. Memory 608 also includes recommendation engine 614, corresponding to recommendation engine 114, which generates prioritized performance test workloads, based on risk profiles relating to a software release, for execution over a number of prioritized variability dimensions.

Storage 610, as shown in FIG. 6, includes baseline workload 630 and variability coverage matrix 635, which are, in some embodiments, generated and stored by controller 600. Storage 610 also stores recommended workload 640 and recommended variability coverage matrix 645 after they are generated by recommendation engine 614. Although only one of each baseline workload 630, variability coverage matrix 635, recommended workload 640, and recommended variability coverage matrix 645 is shown, a plurality of each may be stored in storage 610 for each software release, for example.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for recommending prioritized performance test workloads, the method comprising:
retrieving, by a processor, a baseline workload and variability coverage matrix associated with an aspect of a software release, wherein the variability coverage matrix identifies variations of the baseline workload in the software release;
retrieving, by the processor, from one or more external resources, information about the software release based on keywords associated with a baseline test workload for a software release;
creating, by the processor, a risk profile for the software release based, at least in part, on a number of matches to each of the keywords in the retrieved information, wherein the risk profile includes weightings to apply to the baseline workload for each variation of a workload in the variability coverage matrix, and wherein each of the keywords has a corresponding weight, and creating the risk profile comprises adjusting a weighting associated with each keyword in the baseline test workload by the corresponding weight for each instance of the keyword in the retrieved information;

generating, by the processor, a prioritized test workload for execution over one or more prioritized variability dimensions based on the risk profile and the baseline test workload, wherein generating the prioritized test workload comprises adjusting, for a variability dimension in the variability coverage matrix, a distribution of tests to execute for each value defined for the variability dimension; and executing, by the processor, a test of the software release based on the prioritized test workload.

2. The method of claim 1, wherein one of the keywords associated with the baseline test workload is related to one or more other keywords associated with the baseline test workload.

3. The method of claim 2, wherein creating the risk profile further comprises adjusting weights associated with the one of keywords associated with the baseline test workload and the one or more other keywords associated with the baseline test workload.

4. The method of claim 1, wherein the one or more external resources comprise data relating to the software release.

5. The method of claim 4, wherein the data comprises at least one of production defects, customer experience, or code updates associated with the software release.

6. The method of claim 1, wherein retrieving the information about the software release comprises retrieving information committed to the one or more external resources after a previous version of the software release was released.

7. A system comprising:
a processor; and
a memory comprising instructions which, when executed on the processor, perform a method for recommending prioritized performance test workloads, the method comprising:
retrieving a baseline workload and variability coverage matrix associated with an aspect of a software release, wherein the variability coverage matrix identifies variations of the baseline workload in the software release;
retrieving from one or more external resources, information about the software release based on keywords associated with a baseline test workload for a software release;
creating a risk profile for the software release based, at least in part, on a number of matches to each of the keyword in the retrieved information, wherein the risk profile includes weightings to apply to the baseline workload for each variation of a workload in the variability coverage matrix, and wherein each of the keywords has a corresponding weight, and creating the risk profile comprises adjusting a weighting associated with each keyword in the baseline test workload by the corresponding weight for each instance of the keyword In the retrieved information;
generating a prioritized test workload for execution over one or more prioritized variability dimensions based on the risk profile and the baseline test workload, wherein generating the prioritized test workload comprises adjusting, for a variability dimension in the variability coverage matrix, a distribution of tests to execute for each value defined for the variability dimension; and executing a test of the software release based on the prioritized test workload.

8. The system of claim 7, wherein one of the keywords associated with baseline test workload is related to one or more other keywords associated with the baseline test workload.

9. The <<system of claim 8, wherein the creating the risk profile further comprises adjusting weights associated with the one of the keywords associated with the baseline test workload and the one or more other keywords associated with the baseline test workload.

10. The system of claim 7, wherein the one or more external resources comprise data relating to the software release.

11. The system of claim 10, wherein the data comprises at least one of production defects, customer experience, or code updates associated with the software release.

12. The system of claim 7, wherein retrieving the information about the software release comprises retrieving information committed to the one or more external resources after a previous version of the software release was released.

13. A non-transitory computer-readable medium comprising instructions which, when executed by one or more processors, perform an operation for recommending prioritized performance test workloads, the operation comprising:
retrieving a baseline workload and variability coverage matrix associated with an aspect of a software release, wherein the variability coverage matrix identifies variations of the baseline workload in the software release;
retrieving from one or more external resources, information about the software release based on keywords associated with a baseline test workload for a software release;
creating a risk profile for the software release based, at least in part, on a number of matches to each of the keywords in the retrieved information, wherein the risk profile includes weightings to apply to the baseline workload for each variation of a workload in the variability coverage matrix, and wherein each of the keywords has a corresponding weight, and creating the risk profile comprises adjusting a weighting associated with each keyword in the baseline test workload by the corresponding weight for each instance of the keyword in the retrieved Information;
generating a prioritized test workload for execution over one or more prioritized variability dimensions based on the risk profile and the baseline test workload, wherein generating the prioritized test workload comprises adjusting, for a variability dimension in the variability coverage matrix, a distribution of tests to execute for each value defined for the variability dimension; and
executing a test of the software release based on the prioritized test workload.

14. The non-transitory computer-readable medium of claim 13, wherein retrieving the information about the software release comprises retrieving information committed to the one or more external resources after a previous version of the software release was released.

15. The non-transitory computer-readable medium of claim 13, wherein one of the keywords associated with the baseline test workload is related to one or more other keywords associated with baseline test workload.

16. The non-transitory computer-readable medium of claim 15, wherein creating the risk profile further comprises adjusting weights associated with the one of the keywords associated with the baseline test workload and the one or more other keywords associated with the baseline test workload.

17. The non-transitory computer-readable medium of claim 13, wherein the one or more external resources comprise data relating to the software release.

18. The non-transitory computer-readable medium of claim 17, wherein the data comprises at least one of production defects, customer experience, or code updates associated with the software release.

* * * * *